US012756018B2

(12) United States Patent
Hu et al.

(10) Patent No.: US 12,756,018 B2
(45) **Date of Patent: *Oct. 6, 2026**

(54) CELL, BATTERY MODULE, BATTERY PACK, AND ELECTRIC VEHICLE

(71) Applicant: BYD COMPANY LIMITED, Shenzhen (CN)

(72) Inventors: Shichao Hu, Shenzhen (CN); Qingbo Peng, Shenzhen (CN); Yan Zhu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 1049 days.

This patent is subject to a terminal disclaimer.

(21) Appl. No.: 17/889,346

(22) Filed: Aug. 16, 2022

(65) Prior Publication Data

US 2022/0393248 A1 Dec. 8, 2022

Related U.S. Application Data

(63) Continuation of application No. PCT/CN2021/075186, filed on Feb. 4, 2021.

(30) Foreign Application Priority Data

Feb. 18, 2020 (CN) ........................ 202010097965.2

(51) Int. Cl.
*H01M 10/0585* (2010.01)
*H01M 10/0525* (2010.01)
(Continued)

(52) U.S. Cl.
CPC ... *H01M 10/0585* (2013.01); *H01M 10/0525* (2013.01); *H01M 50/121* (2021.01); *H01M 50/51* (2021.01); *H01M 2220/20* (2013.01)

(58) Field of Classification Search
CPC .......... H01M 10/0585; H01M 50/121; H01M 50/51; H01M 10/0525; H01M 2220/20
See application file for complete search history.

(56) References Cited

U.S. PATENT DOCUMENTS

2004/0201366 A1* 10/2004 Kimoto .............. H01M 10/613 320/150
2005/0208374 A1* 9/2005 Sakurai ................ H01M 6/425 429/162
(Continued)

FOREIGN PATENT DOCUMENTS

CN 100431199 C 11/2008
CN 201682022 U 12/2010
(Continued)

OTHER PUBLICATIONS

International Search Report and Written Opinion for Application No. PCT/CN2021/075186, mailed on May 8, 2021, 12 pages.

*Primary Examiner* — Nicole M. Buie-Hatcher
*Assistant Examiner* — Taylor Harrison Krone
(74) *Attorney, Agent, or Firm* — Sheppard Mullin Richter & Hampton LLP

(57) ABSTRACT

A cell includes a housing and at least one electrode core assembly array encapsulated inside the housing. The electrode core assembly array includes N rows and M columns of electrode core assemblies, and the electrode core assembly includes an encapsulation film and at least one electrode core encapsulated inside the encapsulation film. The electrode core assemblies are arranged in rows, and each row includes M electrode core assemblies. The electrode core assemblies are arranged in columns, and each column includes N electrode core assemblies. The N electrode core assemblies in each column are connected in series to form an electrode core assembly string. The M electrode core assembly strings are connected in series. An air pressure between (Continued)

the metal housing and the encapsulation film is lower than an air pressure outside the metal housing.

28 Claims, 5 Drawing Sheets

(51) Int. Cl.
*H01M 50/121* (2021.01)
*H01M 50/51* (2021.01)

(56) References Cited

U.S. PATENT DOCUMENTS

2006/0246348 A1* 11/2006 Hamada ............ H01M 10/6551 429/120
2012/0227253 A1* 9/2012 Kumeuchi .......... H01M 10/049 29/623.1
2017/0198103 A1* 7/2017 Lee ......................... C08L 23/12
2018/0175451 A1* 6/2018 Inoue .................... H01M 50/14
2018/0309101 A1* 10/2018 Nakai ................. H01M 50/296
2018/0337378 A1* 11/2018 Stephens ................. B60L 50/66
2019/0088938 A1* 3/2019 Zheng ................... H01M 4/525
2019/0355940 A1* 11/2019 Satou .................. H01M 50/103
2020/0044214 A1* 2/2020 Obrist ................. H01M 10/482

FOREIGN PATENT DOCUMENTS

CN 104412409 A 3/2015
CN 207781826 U 8/2018
CN 108780856 A 11/2018
CN 208819967 U 5/2019
CN 110268550 A 9/2019
CN 110518156 A 11/2019
CN 110518174 A 11/2019
CN 209776139 U 12/2019
CN 110676424 A 1/2020
CN 110828717 A 2/2020
EP 1313156 A2 5/2003
JP 2012523087 A 9/2012
JP 5357373 A 12/2013
JP 2014022157 A 2/2014
KR 20190046171 A 5/2019
WO 2016019769 A1 2/2016
WO 2019134697 A1 7/2019

* cited by examiner

CELL, BATTERY MODULE, BATTERY PACK, AND ELECTRIC VEHICLE

CROSS-REFERENCE TO RELATED APPLICATIONS

This application is a continuation application of International Patent Application No. PCT/CN2021/075186, filed with the China National Intellectual Property Administration (CNIPA) on Feb. 4, 2021, which is based on and claims priority to and benefits of Chinese Patent Application No. 202010097965.2, filed on Feb. 18, 2020. The entire content of all of the above-identified applications is incorporated herein by reference.

FIELD

The present disclosure belongs to the battery field, and more specifically, relates to a cell, a battery module, a battery pack, and an electric vehicle.

BACKGROUND

Currently, battery packs applied to electric vehicles generally include a plurality of cells, to improve capacities of the cells. The plurality of cells are mounted in a housing of the battery pack.

The cell in the related art generally includes a housing and electrode cores encapsulated in the housing. There is also a solution in which a plurality of electrode cores are connected in series, to improve a voltage of the cell. However, the current solution of serial connection has a specific safety problem in an actual application.

SUMMARY

The present disclosure resolves at least one of the technical problems existing in the related art. For this purpose, the present disclosure provides a cell with higher safety performance.

The present disclosure further provides a battery module.

The present disclosure further provides a battery pack and an electric vehicle using the battery pack.

The cell of the present disclosure includes a housing and at least one electrode core assembly array encapsulated in the housing. The at least one electrode core assembly array comprises N rows and M columns of electrode core assemblies, and each of the electrode core assemblies comprises an encapsulation film and at least one electrode core encapsulated in the encapsulation film. Electrode core assemblies of a row are arranged along a length direction of the cell, and each of the N rows comprises M electrode core assemblies. Electrode core assemblies in a column are arranged along a thickness direction or a height direction of the cell, and each of the M columns comprises N electrode core assemblies. The N electrode core assemblies in each column are connected in series to form an electrode core assembly string. The M electrode core assembly strings are connected in series. M and N are integers greater than 1. An air pressure between the housing and the encapsulation film is lower than an air pressure outside the housing.

In the cell of the present disclosure, the electrode core is first encapsulated in the encapsulation film and then is encapsulated into the housing, to achieve a double seal, so that a sealing effect may be effectively improved by using a double-layer sealing effect of the encapsulation film and the housing. In addition, the air pressure between the housing and the encapsulation film is lower than the air pressure outside the housing, so that the housing is as close as possible to the internal electrode core assembly, to reduce an internal gap, thereby preventing the electrode core assembly from moving in the housing and avoiding a relative displacement between the electrode core assemblies. Therefore, cases such as current collector damage, folding of a membrane, and falling of an active material are reduced, the mechanical strength of the entire cell is improved, a service life of the cell is prolonged, and the safety performance of the cell is improved. In addition, through the arrangement manner of the electrode core assemblies of the present disclosure, a relatively long cell may be manufactured more conveniently, to reduce the costs and further ensure that the heat dissipation efficiency of the cell is improved. Therefore, by using the solution of the present disclosure, the relatively long and strong cell may be easily implemented, so that when the cell is mounted into a housing of a battery pack, arrangement of support structures such as a cross beam and a longitudinal beam in the battery pack may be reduced. The cell is directly mounted in the housing of the battery pack by using the cell as a support, to reduce an internal space of the battery pack, thereby improving volume utilization of the battery pack and reducing the weight of the battery pack.

Additional aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description of the embodiments made with reference to the following accompanying drawings.

DETAILED DESCRIPTION

Figure 1:
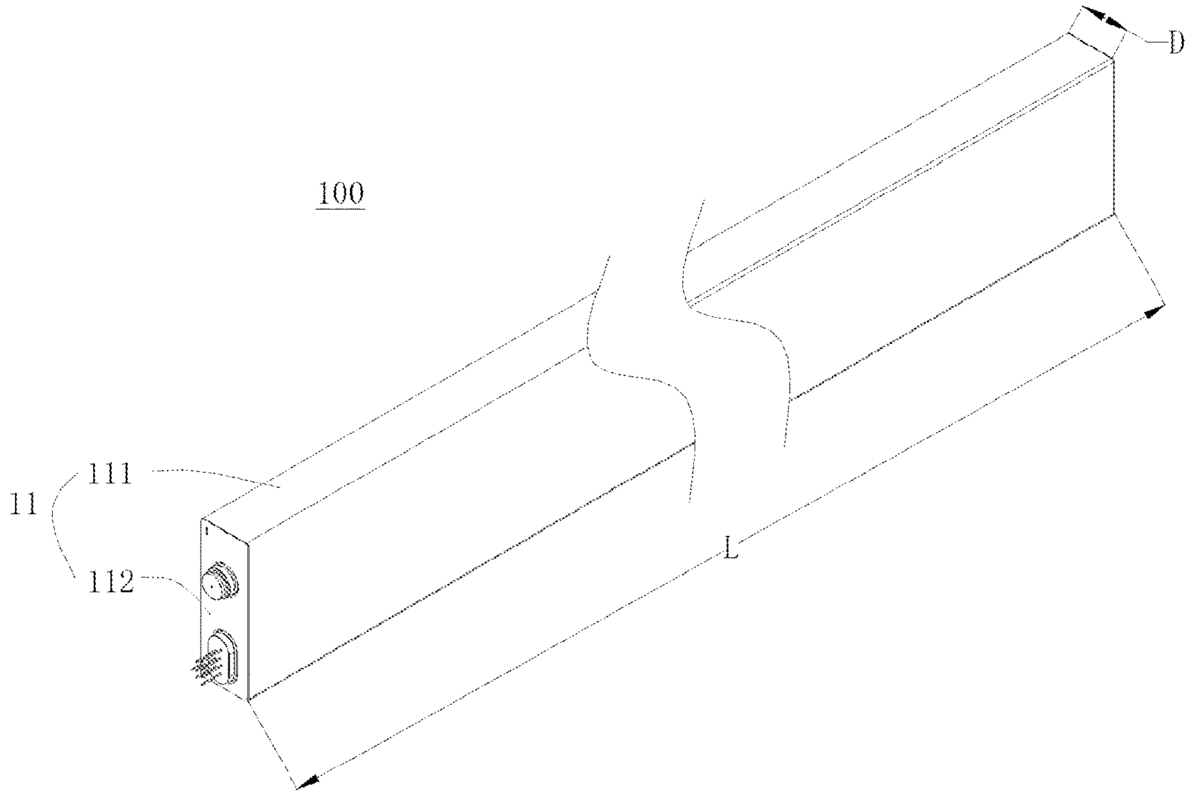
FIG. 1 is a schematic three-dimensional structural diagram of a cell according to an embodiment of the present disclosure.

Embodiments of the present disclosure are described in detail below, and examples of the embodiments are shown in the accompanying drawings, where the same or similar elements or the elements having same or similar functions are denoted by the same or similar reference numerals throughout the description. The embodiments described below with reference to the accompanying drawings are exemplary and used only for explaining the present disclosure, and should not be construed as a limitation on the present disclosure.

As shown in FIG. 1 to FIG. 4, the present disclosure provides a cell 100, for example, used for forming a battery pack. The cell 100 includes a housing 11 and at least one electrode core assembly array 14 encapsulated inside the housing 11. In some embodiments, the housing may be a metal housing. The electrode core assembly array 14 includes N rows and M columns of electrode core assemblies 12. Each of the electrode core assemblies 12 includes an encapsulation film and at least one electrode core encapsulated inside the encapsulation film. In a length direction of the cell 100, the electrode core assemblies 12 are arranged in rows and each row includes M electrode core assemblies 12. In a thickness or height direction of the cell 100, the electrode core assemblies 12 are arranged in columns and each column includes N electrode core assemblies 12. The N electrode core assemblies 12 in each column are connected in series to form an electrode core assembly string 13. The M electrode core assembly strings 13 are connected in series. M and N are integers greater than 1. An air pressure between the housing 11 and the encapsulation film is lower than an air pressure outside the housing 11.

In the cell of the present disclosure, the electrode core is first encapsulated in the encapsulation film and then is encapsulated into the housing 11, to achieve a double seal, so that a sealing effect may be effectively improved by using a double-layer sealing effect of the encapsulation film and the housing 11. In addition, the air pressure between the housing 11 and the encapsulation film is lower than the air pressure outside the housing 11, so that the housing 11 is as close to the internal electrode core assembly 12 as possible, to reduce an internal gap, thereby preventing the electrode core assembly 12 from moving in the housing 11 and avoiding a relative displacement between the electrode core assemblies 12. Therefore, cases such as current collector damage, folding of a membrane, and falling of an active material are reduced, the mechanical strength of the entire cell is improved, a service life of the cell is prolonged, and the safety performance of the cell is improved. In addition, through the arrangement manner of the electrode core assemblies of the present disclosure, a relatively long cell may be manufactured more conveniently, to reduce the costs and further ensure that the heat dissipation efficiency of the cell is improved. Therefore, by using the solution of the present disclosure, the relatively long and strong cell may be easily implemented, so that when the cell is mounted into a housing of a battery pack, the arrangement of support structures such as a cross beam and a longitudinal beam in the battery pack may be reduced. The cell is directly mounted in the housing of the battery pack by using the cell as a support, to reduce an internal space of the battery pack, thereby improving the volume utilization of the battery pack and reducing the weight of the battery pack.

As shown in FIG. 1 to FIG. 4, in this embodiment, a length of the electrode core assembly 12 extends along the length direction of the cell. The electrode core assembly 12 includes a first electrode lead-out member 121 and a second electrode lead-out member 122 respectively extending from two ends of the electrode core assembly 12 along a length direction and configured to lead out a current. Quantities of first electrode lead-out members 121 and second electrode lead-out members 122 are not limited, and only two electrode lead-out members with different electrode cores are represented herein. A first electrode lead-out member 121 of one electrode core assembly 12 of two adjacent electrode core assemblies 12 in each column is electrically connected to a second electrode lead-out member 122 of the other electrode core assembly 12 of the two adjacent electrode core assemblies.

For example, a first electrode lead-out member 121 of one electrode core assembly 12 of two adjacent electrode core assemblies 12 in each column and a second electrode lead-out member 122 of the other electrode core assembly 12 of the two adjacent electrode core assemblies are arranged on a same side of the column, to achieve a simpler connection, thereby further improving the safety performance of the cell and reducing the costs of the cell. The connection between the first electrode lead-out member 121 and the second electrode lead-out member 122 may be a direct connection or an indirect connection such as connection by a conductive member.

Figure 2:
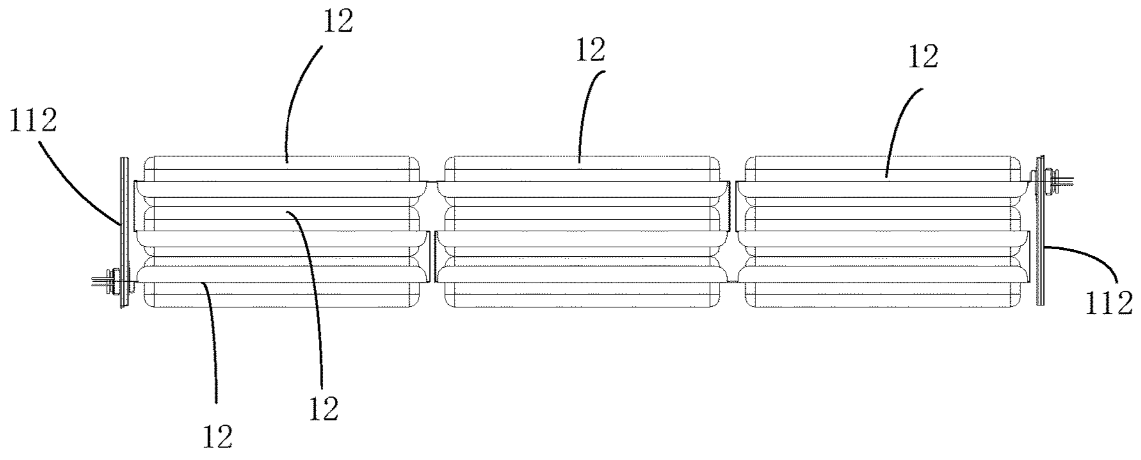
FIG. 2 is a schematic structural diagram of an electrode core assembly array according to an embodiment of the present disclosure.
Figure 3:
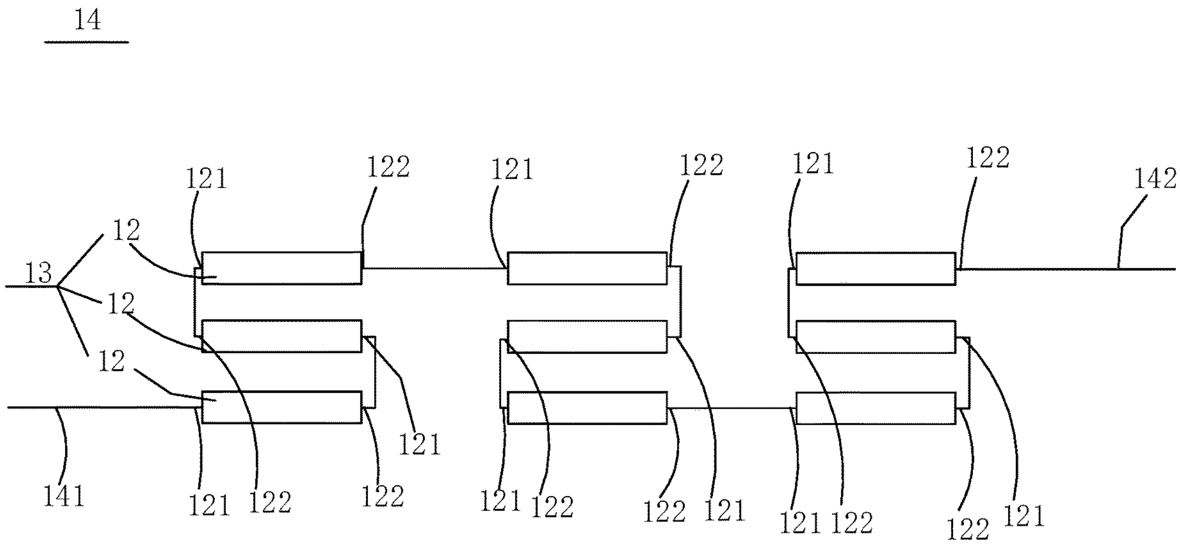
FIG. 3 is a schematic diagram in which electrode core assemblies of an electrode core assembly array are electrically connected according to an embodiment of the present disclosure.
Figure 4:
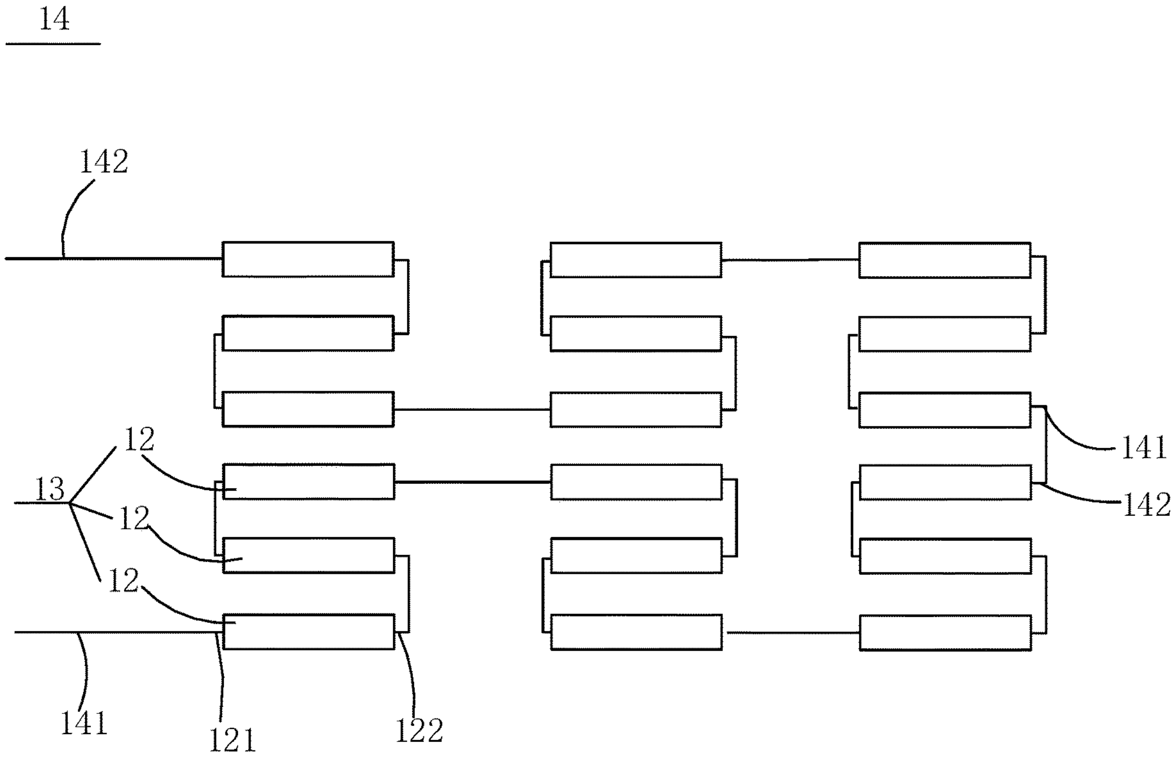
FIG. 4 is a schematic diagram in which electrode core assemblies of an electrode core assembly array are electrically connected according to an embodiment of the present disclosure.

As shown in FIG. 2 to FIG. 4, in this embodiment, an electrode core assembly 12 at a tail end of one electrode core assembly string 13 of two adjacent electrode core assembly strings 13 is electrically connected to an electrode core assembly 12 at a tail end of the other electrode core assembly string 13 of the two adjacent electrode core assembly strings. Or a first electrode core assembly 12 of one electrode core assembly string 13 of two adjacent electrode core assembly strings 13 is electrically connected to a first electrode core assembly 12 of the other electrode core assembly string 13 of the two adjacent electrode core assembly strings, to implement a serial connection between the electrode core assembly strings 13. A first electrode lead-out member 121 of an electrode core assembly 12 at a tail end of one electrode core assembly string 13 of the two adjacent electrode core assembly strings 13 is adjacent to a second electrode lead-out member 122 of an electrode core assembly 12 at a tail end of the other electrode core assembly string 13 of the two adjacent electrode core assembly strings. Or a first electrode lead-out member 121 of a first electrode core assembly 12 of one electrode core assembly string 13 of the two adjacent electrode core assembly strings 13 is adjacent to a second electrode lead-out member 122 of a first electrode core assembly 12 of the other electrode core assembly string 13 of the two adjacent electrode core assembly strings, to achieve a simpler connection, thereby further improving the safety performance of the cell and reducing the costs of the cell. The connection between the first electrode lead-out member 121 and the second electrode lead-out member 122 may be a direct connection or an indirect connection such as a connection by a conductive member.

In this embodiment of the present disclosure, the N electrode core assemblies 12 are arranged along the thickness direction of the cell. A thickness of the electrode core assembly 12 extends along the thickness direction of the cell. In the series connection manner, the electrode core assembly array 14 includes a first main electrode 141 and a second main electrode 142 configured to lead out a series current. As shown in FIG. 3, three electrode core assemblies 12 arranged along the thickness direction are connected in series. A second electrode lead-out member 122 of a third electrode core assembly 12 is connected to a first electrode lead-out member 121 of a second electrode core assembly 12, and the two electrode lead-out members are on a same side. A second electrode lead-out member 122 of the second electrode core assembly 12 is connected to a first electrode lead-out member 121 of a first electrode core assembly 12, and the two electrode lead-out members are on a same side. A second electrode lead-out member 122 of the first electrode core assembly 12 is configured to be electrically connected to a next electrode core assembly string 13.

As shown in FIG. 3, the three electrode core assemblies are connected to form S-shaped electrode core assembly strings 13. In the formed electrode core assembly strings 13, that is, a second electrode lead-out member 122 of a first electrode core assembly 12 of a first electrode core assembly string 13 is connected to a first electrode lead-out member 121 of a first electrode core assembly 12 of a second electrode core assembly string 13, and the two electrode lead-out members are adjacent. Then, in the second electrode core assembly string 13, a second electrode lead-out member 122 of the first electrode core assembly 12 is connected to a first electrode lead-out member 121 of a second electrode core assembly 12, and the two electrode lead-out members are on a same side. A second electrode lead-out member 122 of the second electrode core assembly 12 is connected to a first electrode lead-out member 121 of a third electrode core assembly 12, and the two electrode lead-out members are on a same side. A second electrode lead-out member 122 of the third electrode core assembly 12 is configured to be electrically connected to a next electrode core assembly string 13.

The second electrode lead-out member 122 of the third electrode core assembly 12 of the second electrode core assembly string 13 is connected to a first electrode lead-out member 121 of a third electrode core assembly 12 of the third electrode core assembly string 13, and the two electrode lead-out members are adjacent. Then, in the third electrode core assembly string 13, a second electrode lead-out member 122 of the third electrode core assembly 12 is connected to a first electrode lead-out member 121 of a second electrode core assembly 12, and the two electrode lead-out members are on a same side. A second electrode lead-out member 122 of the second electrode core assembly 12 is connected to a first electrode lead-out member 121 of a first electrode core assembly 12, and the two electrode lead-out members are on a same side. A second electrode lead-out member 122 of the first electrode core assembly 12 is configured to lead out a second main electrode 142.

A first electrode lead-out member 121 of a third electrode core assembly 12 of the first electrode core assembly string 13 is configured to lead out a first main electrode 141 The first main electrode 141 and the second main electrode 142 respectively extend from two opposite corners of the electrode core assembly array 14. The connection relationship is described from only the accompanying drawings herein, and a specific connection sequence during preparation is not limited in this embodiment and may be adjusted according to an actual situation.

As shown in FIG. 4, the obtained electrode core assembly arrays 14 may be connected in series. A second main electrode 142 of a first electrode core assembly array 14 is connected to a first main electrode 142 of a second electrode core assembly array 14, and the two main electrodes are on a same side and are better adjacent. In another embodiment, serial connection is not limited between two electrode core assembly arrays 14, and a plurality of electrode core assembly arrays 14 may be connected in series. Values of M and N in each electrode core assembly array 14 may be the same or may be different, that is, quantities of electrode core assemblies in each electrode core assembly array 14 may be the same or may be different.

In the present disclosure, the electrode core may be an electrode core commonly used in the field of power batteries and may be an electrode core formed by winding or may be an electrode core made by lamination. Generally, the electrode core includes at least a positive electrode plate, a membrane, and a negative electrode plate. In the present disclosure, one or more electrode cores may be provided in the electrode core assembly. Generally, a plurality of electrode cores are connected in parallel. It should be noted that, the electrode core assembly shall not be understood as the cell. The cell mentioned in the present disclosure is an independent single cell and shall not be simply understood as a battery module 300 or a battery assembly because the cell includes a plurality of electrode core assemblies.

The first electrode lead-out member 121 and the second electrode lead-out member 122 of the electrode core assembly 12 respectively extend from the encapsulation film. If the electrode core assembly 12 includes only one electrode core, the first electrode lead-out member 121 and the second electrode lead-out member 122 may be respectively an anode tab and a cathode tab of the electrode core or may be respectively a cathode tab and an anode tab. If the electrode core assembly includes a plurality of electrode cores, the first electrode lead-out member 121 may be a lead-out member formed by compounding and welding the anode tabs, and the second electrode lead-out member 122 may be a lead-out member formed by compounding and welding the cathode tabs. In an embodiment, the first electrode lead-out member 121 may be a lead-out member formed by compounding and welding the cathode tabs, and the second electrode lead-out member 122 may be a lead-out member formed by compounding and welding the anode tabs. The “first” and “second” in the first electrode lead-out member 121 and the second electrode lead-out member 122 are merely used for distinguishing name but are not used for limiting quantities. For example, one or more first electrode lead-out members 121 may be provided.

The housing 11 includes a housing body 111 having an opening and a cover plate 112 connected to the opening in a sealed manner. The cover plate 112 and the housing body 111 enclose a sealed accommodating cavity, and the electrode core assembly array 14 is arranged in the accommodating cavity. The first main electrode 141 and the second main electrode 142 are led out from the cover plate 112. The quantity of cover plates 112 is not limited in the present disclosure and one or two cover plates may be provided. A position of the opening in the housing body 111 and the quantity of cover plates 112 may be designed according to the design of the internal electrode core assembly array 14.

In some implementations, the housing body 111 may be provided with openings at two ends, and two cover plates 112 may be provided, so that the two cover plates 112 are respectively connected to the openings at two ends of the housing body 111 in a sealed manner, to form the sealed accommodating cavity. In this manner, the first main electrode 141 and the second main electrode 142 of the electrode core assembly array 14 may be led out from the same cover plate 112 or may be respectively led out from two cover plates 112. This is not limited. In some implementations, the housing body 111 may be provided with an opening at only one end, and one cover plate 112 is provided, so that the cover plate 112 is connected to the opening at one end of the housing body 111 in a sealed manner. In this manner, the first main electrode 141 and the second main electrode 142 of the electrode core assembly array 14 are led out from the same cover plate 112.

In this embodiment of the present disclosure, the electrode core is encapsulated in the encapsulation film, that is, the encapsulation film is further arranged between the housing 11 and the electrode core. Therefore, a double encapsulation on the electrode core may be implemented by using the encapsulation film and the housing 11, which is beneficial to improving the sealing effect of the cell. Generally, an electrolyte solution is inside the encapsulation film. Therefore, in this manner, the electrolyte solution may be prevented from being in contact with the housing 11, to avoid corrosion of the housing 11 or decomposition of the electrolyte solution. An air pressure between the housing 11 and the encapsulation film is lower than an air pressure outside the housing 11. In the present disclosure, the "air pressure" is an abbreviation of an atmospheric pressure and is applied on a unit area, that is, it is equal to a weight of a vertical air column extending upward to an upper bound of an atmosphere per unit area. The air pressure between the housing 11 and the encapsulation film is an air pressure in a space between the housing 11 and the encapsulation film, and the air pressure is lower than the air pressure outside the housing 11. Therefore, in this embodiment of the present disclosure, a space between the housing 11 and the encapsulation film is in a negative pressure state, so that the housing 11 is recessed or deformed under the action of air pressure, and a gap between the housing 11 and the electrode core assembly is reduced. A space for movement of the electrode core assemblies or displacement between the electrode core assemblies is reduced, to reduce the movement of the electrode core assemblies and a relative displacement between the electrode core assemblies, thereby improving the stability of the cell 100 and improving the strength of the cell 100 and the safety performance of the cell 100.

For example, air extraction processing may be performed on the space between the housing 11 and the encapsulation film, so that the space between the housing 11 and the encapsulation film is in the negative pressure state. Therefore, the housing 11 may be as close as possible to the internal electrode core assembly, to reduce the internal gap, thereby preventing the electrode core assembly from moving in the housing and avoiding the relative displacement between the electrode core assemblies. Therefore, cases such as current collector damage, folding of a membrane, and falling of an active material are reduced, the mechanical strength of the entire cell is improved, a service life of the cell is prolonged, and the safety performance of the cell is improved.

In an implementation, the air pressure between the housing 11 and the encapsulation film is P1, and a value of P1 may range from −100 kPa to −5 kPa.

Certainly, a person skilled in the art may set the value of P1 according to an actual requirement. For example, the value of P1 may range from −75 kPa to −20 kPa. It should be noted that, the space between the housing 11 and the encapsulation film may be in a vacuum state.

An air pressure within the encapsulation film is P2, and a relationship between P1 and P2 satisfies that P1/P2 ranges from 0.05 to 0.85. A value of P2 may range from −100 kPa to −20 kPa.

P1, P2, and P1/P2 are limited in the range. The electrode core in this technology adopts a double sealing mode. The electrode core is first encapsulated in the encapsulation film. To avoid damage to the encapsulation film caused by outward bulge of the encapsulation film due to an excessively large internal air pressure, the air pressure between the housing 11 and the encapsulation film is higher than the air pressure within the encapsulation film. In addition, it is verified through a large number of experiments that when P1/P2 is in the range, the reliability of the double sealing of the cell is better. Moreover, an interface between electrode plates of the cell is ensure, and a gap between the electrode plates is avoided, to enable a lithium ion to be better conducted.

In some implementations, the air pressure within the encapsulation film is lower than the air pressure between the housing 11 and the encapsulation film.

In the arrangement manner in the present disclosure, every two electrode core assemblies 12 may be connected in series conveniently, and a connection structure is simple. In addition, in the arrangement manner, a relatively long cell 100 may be manufactured conveniently. Therefore, the cell 100 may be mounted in a housing of a battery pack without support structures such as a cross beam and a longitudinal beam, and the cell 100 is directly mounted in the housing of the battery pack by using the housing 11 of the cell 100 as a support. Therefore, the internal space of the battery pack may be reduced, thereby improving the volume utilization of the battery pack and reducing the weight of the battery pack.

The cell is substantially a cuboid, and a length L of the cell ranges from 400 mm to 2500 mm (millimeter), for example, may be 500 mm, 1000 mm, or 1500 mm. In a manner in which a plurality of electrode core assemblies are arranged in the cell, a relatively long cell may be manufactured more conveniently compared with an existing manner in which only one electrode core is arranged. In a conventional cell, once the cell is relatively long, a length of a copper-aluminum foil used as a current collector inside the cell is increased correspondingly, which greatly increases the internal resistance of the cell and cannot meet current requirements for a high power and fast charging. In a case that the lengths of the cells are the same, in this embodiment of the present disclosure, the internal resistance of the cell may be greatly reduced, to avoid problems caused by overheating of the cell under the conditions of high power output and fast charging.

A thickness D of the cell may be greater than 10 mm, for example, may range from 13 mm to 75 mm. In this embodiment of the present disclosure, a ratio of the length of the cell to the thickness of the cell ranges from 5 to 250.

In this embodiment of the present disclosure, the cell is provided with two opposing first surfaces 113 along the thickness direction of the cell. The first surfaces 113 are largest surfaces of the cell, that is, "large surfaces" of the cell. At least one first surface 113 is recessed toward the inside of the housing 11, so that the housing 11 may be as close as possible to the electrode core assembly.

Because the housing 11 has a relatively small thickness and is a relatively thin sheet, a recess 114 on the first surface 113 of the cell may be, for example, a recess formed by performing air extraction on the inside of the housing 11. That is, air extraction processing is performed on the space between the housing 11 and the encapsulation film, so that when the air pressure between the housing 11 and the encapsulation film is lower than the air pressure outside the housing 11, the first surface 113 of the cell is easily recessed toward the inside of the housing 11 to form the recess 114 as air extraction is performed.

During the normal use of the cell, the cell usually expands due to expansion of a material, gas production of the electrolyte solution, or the like, and a region that expands and is deformed greatly is the large surface of the cell. By using the technology, the large surface of the cell is limited to be slightly recessed inward by vacuuming when the cell is in an initial state, which can effectively relieve extrusion between the cells after the cell expands, thereby improving the service life and the safety performance of the cell and the entire system.

Figure 5:
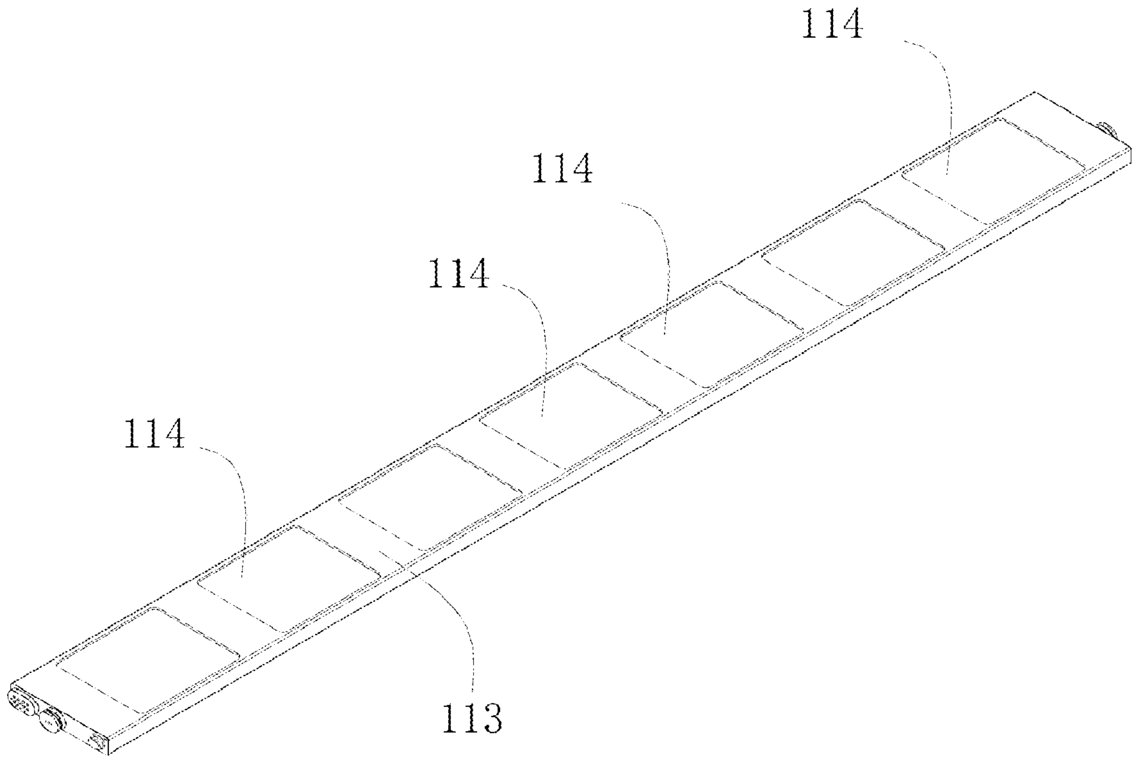
FIG. 5 is a schematic diagram in which a first surface of a housing is recessed according to an embodiment of the present disclosure.

In some other embodiments, as shown in FIG. 5, a recess may be formed on the first surface 113 of the housing 11 in advance, then the air extraction processing is performed on the inside of the housing 11. A plurality of recesses 114 may be provided on the first surface 113 of the housing 11. For example, a plurality of recesses 114 are formed on the first surface 113 in advance, and a position of each recess corresponds to a position of one electrode core assembly.

In some implementations, the two opposing first surfaces 113 of the cell are both recessed toward the inside of the housing, to clamp the electrode core assembly by using recessed regions.

An exhaust hole may be provided on the housing 11. An air extraction operation is performed on the space between the housing 11 and the encapsulation film by using the exhaust hole. The exhaust hole needs to be sealed. Therefore, a sealing member is further arranged inside the exhaust hole, to seal the exhaust hole. The sealing member may be, for example, a plug or a rubber member. This is not limited.

In some implementations, before the air extraction is performed on the housing 11, a gap is provided between the electrode core assembly and an inner surface of the housing 11. The gap facilitates convenient mounting of the electrode core assembly into the housing 11. After the air extraction is performed on the housing 11, the housing 11 is pressed on an outer surface of the electrode core assembly along a second direction to clamp the electrode core assembly, to reduce a space for the electrode core assembly to move inside the housing, thereby improving the safety performance of the cell.

The aluminum plastic film has a relatively poor heat dissipation effect and a low strength and is limited by a manufacturing process. A cell 100 with a relatively large thickness cannot be prepared by using the aluminum plastic film as a housing of the cell 100. In this embodiment of the present disclosure, different from the existing aluminum plastic film, the housing 11 has a high strength and a good heat dissipation effect, and the housing 11 may include, but not limited to, an aluminum housing or a steel housing.

In some embodiments, a thickness of the housing 11 ranges from 0.05 mm to 1 mm. When the thickness of the housing 11 is relatively large, the weight of the cell 100 may be increased, a capacity of the cell 100 is reduced, and the present disclosure is not easily implemented. In this embodiment, the thickness of the housing 11 may be selected from the foregoing range, which not only can ensure the strength of the housing 11 but also does not reduce the capacity of the cell 100. In a negative pressure state, the housing 11 may be more easily deformed, to reduce a distance between the housing 11 and the electrode core assembly, thereby reducing movement of the electrode core assembly inside the housing 11 and the relative displacement between the electrode core assemblies.

In the present disclosure, the encapsulation film is an aluminum-plastic compound film. In an embodiment, the encapsulation film includes a non-metallic outer film and a non-metallic inner film laminated together. The inner film is arranged between the outer film and the electrode core assembly. The inner film has relatively good chemical stability and may be made of, for example, a material with an anti-electrolyte solution corrosion characteristic, which may be a polypropylene (PP), a polyethylene (PE), or a polyethylene terephthalate (PET), or combinations of the materials. The outer film is a protection layer, to prevent penetrations of air, especially water vapor, oxygen, and the like. A material of the outer film may be, for example, polyethylene terephthalate, polyamide (PA), or polypropylene, or combinations of the materials. In the encapsulation film of this embodiment, a melting point of the outer film is higher than a melting point of the inner film. Therefore, when hot melting and sealing are performed, the outer film is not melted, but the inner film can be melted in time to ensure good sealing performance.

A difference between the melting point of the outer film and the melting point of the inner film may range from 30° C. to 80° C. For example, the difference between the melting points may be 50° C., 70° C., or the like. Selection of a specific material may be determined according to an actual requirement. The outer film and the inner film may be bonded by using an adhesive. For example, the material of the outer film may be PP, the material of the inner film may be PET, and a binder for bonding the outer film and the inner film may be, for example, a polyolefin binder, to form a composite film. In this embodiment, the encapsulation film is formed by double layers of non-metallic films to encapsulate the electrode core with a higher tensile strength and elongation rate at break, which may reduce a limitation on the thickness of the cell to obtain a cell with a larger thickness. In this embodiment, the range of the thickness of the cell may be extended, for example, the thickness may be greater than 10 mm, such as a range from 13 mm to 75 mm.

In an embodiment of the present disclosure, the cell is a lithium-ion cell.

Figure 7:
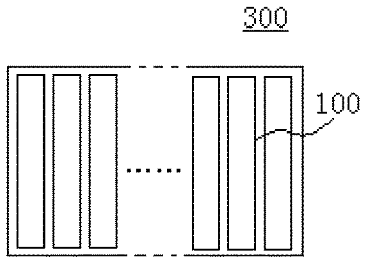
FIG. 7 is a schematic structural diagram of a battery module according to an embodiment of the present disclosure.

As shown in FIG. 7, according to another aspect of the present disclosure, a battery module 300 is provided, including the cell according to any one of the foregoing embodiments. By using the battery module 300 provided in the present disclosure, the sealing performance is better, the assembly process is simple, and the costs of the cell are relatively low.

Figure 6:
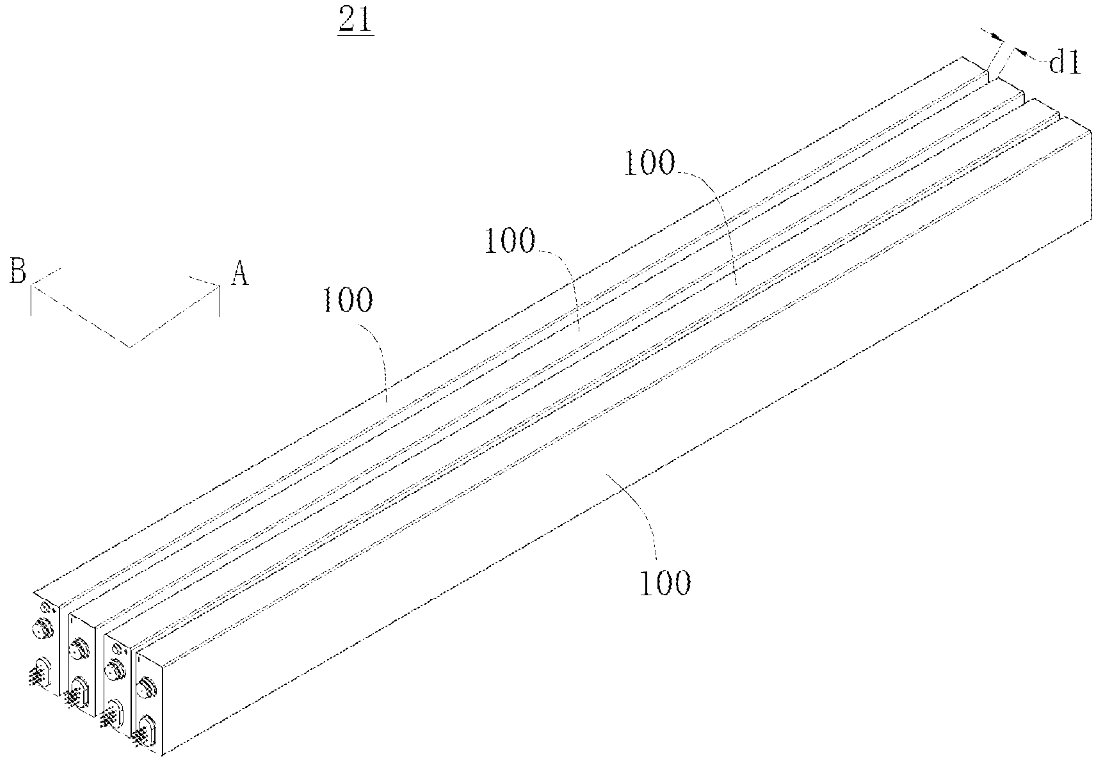
FIG. 6 is a schematic structural diagram of a cell array according to an embodiment of the present disclosure.
Figure 8:
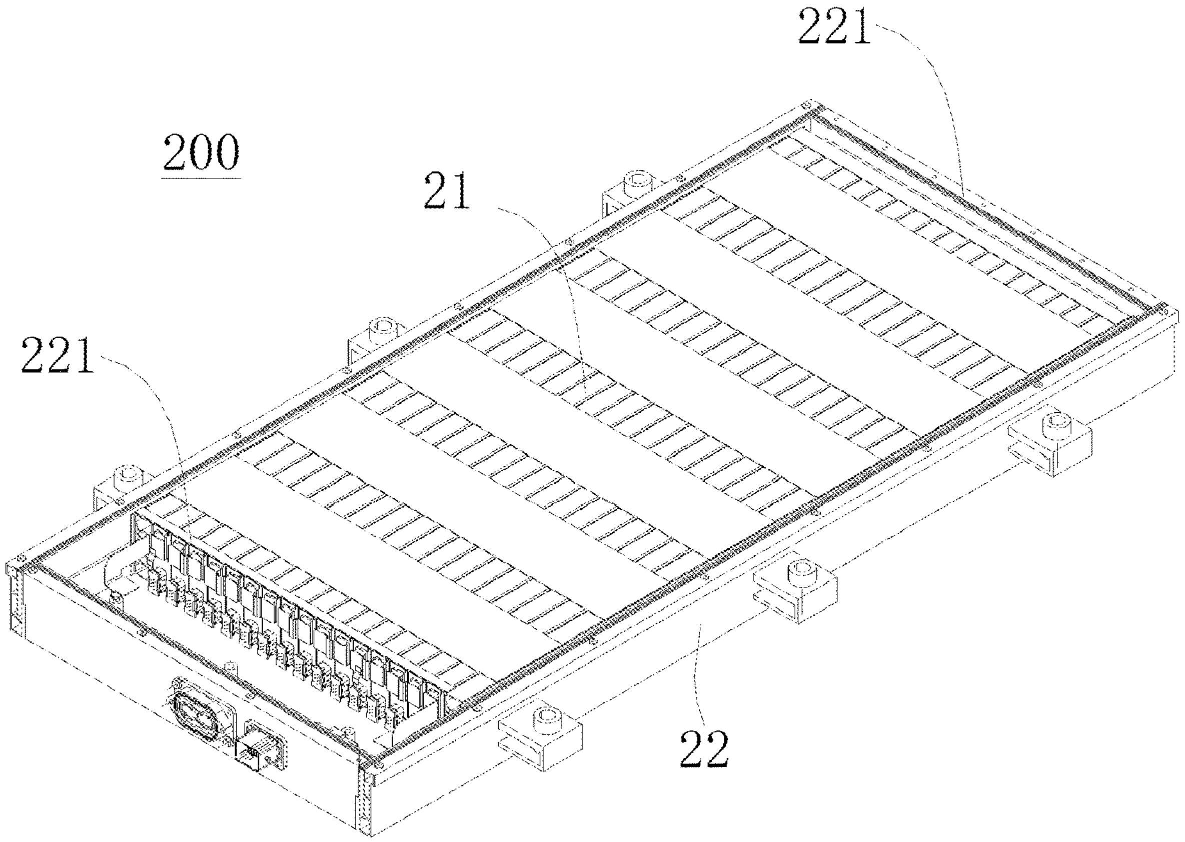
FIG. 8 is a schematic structural diagram of a battery pack according to an embodiment of the present disclosure.
Figure 9:
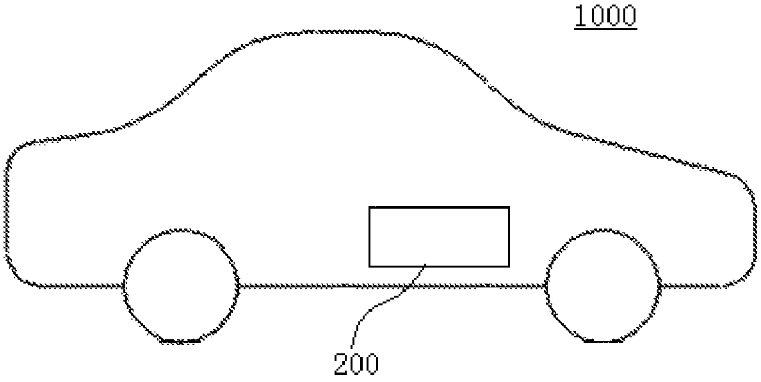
FIG. 9 is a schematic diagram of an electric vehicle according to an embodiment of the present disclosure.

Referring to FIG. 6 and FIG. 8, the present disclosure further provides a battery pack 200, including a cell array 21. The cell array 21 includes a plurality of cells 100. The cell 100 is the cell 100 described in any one of the embodiments. Therefore, a specific structure of the cell 100 is not described herein again.

One or more cell arrays 21 may be provided, and one or more cells 100 may be provided in each cell array 21. During actual production, the quantity of cells 100 may be set according to an actual requirement, and the quantity of cell arrays 21 may also be set according to an actual requirement. This is not specifically limited in the present disclosure.

In this embodiment of the present disclosure, a plurality of cells 100 are sequentially arranged along the thickness direction B of the cell, to form the cell array 21. A gap is provided between at least two adjacent cells 100. A ratio of the gap to a thickness of the cell 100 ranges from 0.001 to 0.15.

It should be noted that, The gap between the two adjacent cells 100 changes as a working time of the cell increases. However, regardless of whether the cell is working, or after the cell works, or before the cell leaves the factory, the gap falls within the protection scope of the present disclosure as long as that the ratio of the gap between the cells to the thickness is within a range limited in the present disclosure.

In the present disclosure, a specific gap is reserved between the cells 100, to reserve a buffer space for expansion of the cell 100.

In the present disclosure, the ratio of the gap between the cells 100 to the thickness of the cell 100 is limited between 0.001 and 0.15, so that a space of the battery pack 200 may be fully used, the utilization of the battery pack 200 is improved, and a better buffer effect may also be achieved for the expansion of the cell 100.

In addition, the cell 100 generates heat during expansion. A specific gap is reserved between the cells 100, and the gap may further be served as a heat dissipation channel such as an air channel. A surface with a relatively large area of the cell 100 has a better heat dissipation effect. Therefore, the heat dissipation efficiency of the battery pack 200 may further be improved, and the safety performance of the battery pack 200 is improved.

In the solution, the gap between the cells 100 may be understood as that no structural member is arranged between the cells 100 and a specific space is simply reserved, or may be understood as that another structural member is arranged between the cells 100 to separate the cells 100 by using the structural member.

It should be noted that, when the structural member is arranged between the cells 100, the gap between the cells 100 should be understood as a distance between the cells 100 on two sides of the structural member but shall not be understood as a distance between the structural member and the cell 100.

It should be noted that gaps may be reserved between the structural member and the cells 100 on two sides of the structural member, or the structural member may be in direct contact with the cells on two sides of the structural member. When the structural member is in direct contact with the cells 100 on the two sides, the structural member should have a specific flexibility and may achieve a buffer effect for the expansion of the cell 100. The structural member includes, but not limited to, aerogel, a heat conductive structure adhesive, or a heat insulation foam.

In the present disclosure, when a plurality of cell arrays 21 are provided, the gap should refer to a distance between two adjacent cells 100 in the same cell array 21 rather than a distance between two adjacent cells in different cell arrays 21. In addition, in the same cell array 21, a specific gap may be reserved between two adjacent cells of all cells or a specific gap may be reserved between two adjacent cells of some of the cells.

In an implementation, the gap between the two adjacent cells 100 includes a first gap d1. The first gap d1 is defined as a minimum distance between two cover plates 112 of two adjacent cells along the thickness direction of the cell. A ratio of the first gap d1 to the thickness of the cell ranges from 0.005 to 0.1.

In the implementation, due to a relatively high strength, the cover plate 112 is not easily expanded compared with the housing body 111. Even though after the cell 100 works for a period of time, a chemical reaction occurs inside the cell, and the cell 100 expands to squeeze adjacent cells 100, the first gap d1 changes (for example, gradually increases), but the change is relatively small and may be ignored. In an embodiment, even though the first gap changes, the ratio of the first gap to the thickness of the cell 100 still meet the range. In the implementation, two ends of the housing body 111 are respectively provided with the cover plates 112. When the cells 100 are arranged along the thickness direction to form the cell array 21, a gap between two cells 100 may be a minimum distance between two cover plates along the thickness direction of the cell at a same end of the cell array or may be a minimum distance between two cover plates along the thickness direction of the cell at different ends of the cell array.

In an implementation, the gap between the two adjacent cells 100 includes a second gap. The second gap is a minimum distance between two first surfaces facing each other of two adjacent cells 100. The second gap before the cell 100 is used is larger than the second gap after the cell is used.

"before use" may be understood as that the cell 100 is to leave the factor or has left the factor after being assembled but does not start providing electric energy to the outside. "after use" may be understood as that after the cell 100 provides electric energy to the outside. For example, after the battery pack 200 is assembled on an electric vehicle 1000, a state before use may be understood as a state of a new vehicle. A state after use should be a state after the vehicle travels for a certain mileage.

In the implementation, the second gap should refer to a minimum distance between two opposing first surfaces of two adjacent cells 100. The distance is gradually reduced as the use time of the cell is increased, which mainly because a distance between two adjacent large surfaces is gradually reduced after the cell expands.

In this embodiment of the present disclosure, the battery pack 200 further includes a battery cover and a tray 22. The battery cover is not shown in FIG. 8. The battery cover is connected to the tray 22 in a sealed manner, to form a battery accommodating cavity, and the cell array 21 is arranged inside the battery accommodating cavity. The tray 22 includes a support member 221 to form a support region on the housing 11 of the cell 100. The cell 100 is butted with the support member 221 by the support region, and is supported on the support member 221.

The tray 22 includes side beams. The sides beams are used as support members 221. Two ends of the cell 100 along the length direction A of the cell are respectively supported on the side beams.

In the cell 100 of the embodiments of the present disclosure, the air pressure between the housing 11 and the encapsulation film is a negative pressure, and the entire strength of the cell may be improved. Therefore, the cell 100 may be directly mounted on the tray 22 by using the strength as a support, so that no structure, such as a cross beam or a longitudinal beam, needs to be arranged on the tray 22 to support the cell 100, thereby improving the utilization of the internal space of the battery pack.

An electric vehicle 1000 is provided and includes the battery pack 200. By using the electric vehicle 1000 provided in the present disclosure, an endurance capability of the vehicle is high, and the costs are relatively low.

The length direction of the cell is arranged along a length direction of a vehicle body of the electric vehicle 1000, and a length of the vehicle body ranges from 500 mm to 5200 mm.

In the descriptions of the present disclosure, it should be noted that, unless otherwise explicitly specified or defined, the terms such as "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

In description of this specification, description of reference terms such as "an embodiment", "specific embodiments", or "an example", means including specific features, structures, materials, or features described in the embodiment or example in at least one embodiment or example of the present disclosure. In this specification, exemplary descriptions of the foregoing terms do not necessarily refer to the same embodiment or example. In addition, the described specific features, structures, materials, or characteristics may be combined in a proper manner in any one or more of the embodiments or examples.

Although the embodiments of the present disclosure have been shown and described, a person of ordinary skill in the art is to be understood that various changes, modifications, replacements, and variations may be made to the embodiments without departing from the principles and spirit of the present disclosure, and the scope of the present disclosure is as defined by the appended claims and their equivalents.

What is claimed is:

1. A cell, comprising a housing and at least one electrode core assembly array encapsulated in the housing, wherein the at least one electrode core assembly array comprises N rows and M columns of electrode core assemblies, and each of the electrode core assemblies comprises an encapsulation film and at least one electrode core encapsulated in the encapsulation film;

electrode core assemblies of a row are arranged along a length direction of the cell, and each of the N rows comprises M electrode core assemblies; and electrode core assemblies in a column are arranged along a thickness direction or a height direction of the cell, and each of the M columns comprises N electrode core assemblies;

the N electrode core assemblies in each column are connected in series to form an electrode core assembly string;

the M electrode core assembly strings are connected in series;

M and N are integers greater than 1; and an air pressure between the housing and the encapsulation film is lower than an air pressure outside the housing, and an air pressure within the encapsulation film is lower than the air pressure between the housing and the encapsulation film.

2. The cell according to claim 1, wherein a length of each of the electrode core assemblies extends along the length direction of the cell;

each of the electrode core assemblies comprises a first electrode lead-out member and a second electrode lead-out member respectively extending from two ends of a corresponding electrode core assembly along a length direction and configured to lead out a current; and a first electrode lead-out member of a first electrode core assembly of two adjacent electrode core assemblies in each column is electrically connected to a second electrode lead-out member of a second electrode core assembly of the two adjacent electrode core assemblies.

3. The cell according to claim 2, wherein the first electrode lead-out member of the first electrode core assembly of the two adjacent electrode core assemblies and the second electrode lead-out member of the second electrode core assembly of the two adjacent electrode core assemblies are arranged on a same side of a column.

4. The cell according to claim 1, wherein an electrode core assembly at a tail end of a first electrode core assembly string of two adjacent electrode core assembly strings is electrically connected to an electrode core assembly at a tail end of a second electrode core assembly string of the two adjacent electrode core assembly strings.

5. The cell according to claim 4, wherein a length of each of the electrode core assemblies extends along the length direction of the cell;

each of the electrode core assemblies comprises a first electrode lead-out member and a second electrode lead-out member respectively extending from two ends of a corresponding electrode core assembly along the length direction and configured to lead out a current; and a first electrode lead-out member of the electrode core assembly at the tail end of the first electrode core assembly string of the two adjacent electrode core assembly strings is adjacent to a second electrode lead-out member of the electrode core assembly at the tail end of the second electrode core assembly string of the two adjacent electrode core assembly strings.

6. The cell according to claim 2, wherein the N electrode core assemblies are arranged along the thickness direction of the cell;

the at least one electrode core assembly array comprises a first main electrode and a second main electrode configured to lead out a main current; and the first main electrode and the second main electrode respectively extend from two opposite corners of the at least one electrode core assembly array.

7. The cell according to claim 1, wherein the at least one electrode core assembly array comprises a plurality of electrode core assembly arrays.

8. The cell according to claim 1, wherein a length of the cell ranges from 400 mm to 2500 mm; and a thickness of the cell ranges from 13 mm to 75 mm.

9. The cell according to claim 1, wherein the air pressure between the housing and the encapsulation film is P1, and P1 ranges from −100 kPa to −5 kPa.

10. The cell according to claim 9, wherein an air pressure within the encapsulation film is P2, and P1/P2 ranges from 0.05 to 0.85.

11. The cell according to claim 1, wherein the cell is provided with two opposing first surfaces along the thickness direction of the cell, and at least one of the first surfaces is recessed toward an inside of the housing.

12. The cell according to claim 11, wherein the two first surfaces are recessed toward the inside of the housing, to clamp the at least one electrode core assembly array.

13. The cell according to claim 1, wherein the encapsulation film comprises a non-metallic outer film and a non-metallic inner film laminated together; the inner film is arranged between an electrode core and the outer film; a melting point of the outer film is higher than a melting point of the inner film; and a difference between the melting point of the outer film and the melting point of the inner film ranges from 30° C. to 80° C.

14. The cell according to claim 13, wherein the outer film comprises one or more of polyethylene terephthalate, polyamide, and polypropylene; and the inner film comprises one or more of polypropylene, polyethylene, and polyethylene terephthalate.

15. The cell according to claim 14, wherein the outer film is bonded to the inner film by a binder, and the binder is a polyolefin binder.

16. The cell according to claim 1, wherein the encapsulation film is an aluminum-plastic compound film.

17. The cell according to claim 1, wherein the housing is provided with an exhaust hole, and a sealing member is arranged inside the exhaust hole.

18. The cell according to claim 1, wherein a thickness of the housing ranges from 0.05 mm to 1 mm.

19. A battery module, comprising the cell according to claim 1.

20. A battery pack, comprising a cell array, wherein the cell array comprises a plurality of cells comprising the cell according to claim 1.

21. The battery pack according to claim 20, wherein the plurality of cells are arranged along the thickness direction of the cell; and a gap is provided between two adjacent cells, and a ratio of the gap to a thickness of the cell ranges from 0.001 to 0.15.

22. The battery pack according to claim 21, wherein the housing comprises a housing body with an opening and a cover plate connected to the opening in a sealed manner, the cover plate and the housing body enclose a sealed accommodating cavity, and the at least one electrode core assembly array is arranged in the sealed accommodating cavity; and the gap between the two adjacent cells comprises a first gap d1, the first gap is a minimum distance between two cover plates of the two adjacent cells along the thickness direction of the cell, and a ratio of the first gap d1 to the thickness of the cell ranges from 0.005 to 0.1.

23. The battery pack according to claim 21, wherein the cell is provided with two opposing first surfaces along the thickness direction of the cell, the gap between the two adjacent cells comprises a second gap, and the second gap is a minimum distance between two first surfaces of the two adjacent cells facing each other.

24. The battery pack according to claim 23, wherein the second gap before use of the cell is larger than the second gap after the use of the cell.

25. The battery pack according to claim 21, further comprising a battery pack cover and a tray, wherein the battery pack cover is connected to the tray in a sealed manner to form a battery accommodating cavity, the cell array is arranged in the battery accommodating cavity, the tray comprises a support member to form a support region on the housing, the cell is supported on the support member in the support region.

26. The battery pack according to claim 25, wherein the tray comprises side beams, the support member comprises the side beams, and two ends of the cell along a length direction are respectively supported on the side beams.

27. An electric vehicle, comprising the battery pack according to claim 20.

28. The electric vehicle according to claim 27, wherein the length direction of the cell is arranged along a length direction of a vehicle body of the electric vehicle.

* * * * *